(12) United States Patent
Berger et al.

(10) Patent No.: US 8,255,789 B2
(45) Date of Patent: Aug. 28, 2012

(54) PROVIDING SPREADSHEET FEATURES

(75) Inventors: Peter Glen Berger, Irwin, PA (US); Yaniv Gur, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 721 days.

(21) Appl. No.: 12/286,598

(22) Filed: Sep. 30, 2008

(65) Prior Publication Data

US 2010/0083086 A1     Apr. 1, 2010

(51) Int. Cl.
G06F 17/00     (2006.01)
(52) U.S. Cl. ............... 715/215; 715/212; 715/213
(58) Field of Classification Search ........... 715/213, 715/212, 215
See application file for complete search history.

(56) References Cited

U.S. PATENT DOCUMENTS

| | | | |
|---|---|---|---|
| 5,381,517 A * | 1/1995 | Thorndike et al. | 706/52 |
| 6,442,575 B2 * | 8/2002 | Pratley et al. | 715/212 |
| 6,665,772 B1 * | 12/2003 | Hamlin | 711/112 |
| 2002/0091728 A1 * | 7/2002 | Kjaer et al. | 707/503 |
| 2003/0039398 A1 * | 2/2003 | McIntyre | 382/239 |
| 2004/0205524 A1 * | 10/2004 | Richter et al. | 715/503 |
| 2007/0204212 A1 * | 8/2007 | Chamberlain et al. | 715/503 |
| 2008/0126395 A1 * | 5/2008 | Marueli | 707/102 |
| 2008/0196001 A1 * | 8/2008 | Hicks et al. | 717/104 |

OTHER PUBLICATIONS

Micorsoft Word 2003, pp. 1-4 attached.*

* cited by examiner

*Primary Examiner* — Doug Hutton, Jr.
*Assistant Examiner* — Andrew McIntosh
(74) *Attorney, Agent, or Firm* — Van Pelt, Yi & James LLP

(57) ABSTRACT

Heuristic based feature degradation and/or restoration is disclosed. In some embodiments, a feature is provided with respect to a set of spreadsheet cells. The feature consumes processing power. If a degradation threshold associated providing the feature is satisfied, the feature is at least partially degraded so that an expected latency of providing the feature is at least in part avoided. If a restoration threshold associated with providing the feature is satisfied, the feature is at least partially restored for the set of cells.

20 Claims, 5 Drawing Sheets

| | | A | B | C | D | E | F | G | H | I | J |
|---|---|---|---|---|---|---|---|---|---|---|---|
| | 1 | 3 | 2 | 9 | 2 | 5 | 2 | 1 | 8 | 2 | 9 |
| | 2 | 2 | 5 | 0 | 2 | 2 | 8 | 2 | 5 | 7 | 6 |
| | 3 | 4 | 2 | 3 | 3 | 2 | 3 | 4 | 3 | 2 | 4 |
| | 4 | 2 | 2 | 2 | 2 | 5 | 6 | 2 | 2 | 2 | 2 |
| | 5 | 5 | 4 | 6 | 7 | 0 | 2 | 2 | 3 | 3 | 4 |
| | 6 | 2 | 2 | 2 | 2 | 6 | 2 | 3 | 2 | 5 | 2 |
| | 7 | 0 | 6 | 2 | 3 | 4 | 7 | 2 | 2 | 4 | 3 |
| | 8 | 6 | 2 | 4 | 3 | 3 | 2 | 1 | 2 | 2 | 2 |
| Summary | 9 | 4 | 9 | 2 | 2 | 2 | 2 | 2 | 7 | 2 | 5 |
| Sum: 32 | 10 | 2 | 7 | 3 | 2 | 4 | 2 | 5 | 2 | 3 | 2 |
| Ave: 3.55 | 11 | 6 | 4 | 2 | 2 | 0 | 4 | 2 | 6 | 2 | 3 |
| Min: 2 | 12 | 2 | 2 | 2 | 3 | 2 | 2 | 7 | 2 | 7 | 2 |
| Max: 7 | 13 | 5 | 7 | 3 | 2 | 2 | 2 | 2 | 4 | 2 | 2 |
| Count: 9 | 14 | 2 | 2 | 6 | 8 | 0 | 2 | 5 | 2 | 3 | 4 |
| | 15 | 7 | 2 | 1 | 2 | 6 | 2 | 4 | 3 | 1 | 2 |

| | A | B | C | D | E | F | G | H | I | J |
|---|---|---|---|---|---|---|---|---|---|---|
| 1 | 3 | 2 | 9 | 2 | 5 | 2 | 1 | 8 | 2 | 9 |
| 2 | 2 | 5 | 0 | 2 | 2 | 8 | 2 | 5 | 7 | 6 |
| 3 | 4 | 2 | 3 | 3 | 2 | 3 | 4 | 3 | 2 | 4 |
| 4 | 2 | 2 | 2 | 2 | 5 | 6 | 2 | 2 | 2 | 2 |
| 5 | 5 | 4 | 6 | 7 | 0 | 2 | 2 | 3 | 3 | 4 |
| 6 | 2 | 2 | 2 | 2 | 6 | 2 | 3 | 2 | 5 | 2 |
| 7 | 0 | 6 | 2 | 3 | 4 | 7 | 2 | 2 | 4 | 3 |
| 8 | 6 | 2 | 4 | 3 | 3 | 2 | 1 | 2 | 2 | 2 |
| 9 | 4 | 9 | 2 | 2 | 2 | 2 | 2 | 7 | 2 | 5 |
| 10 | 2 | 7 | 3 | 2 | 4 | 2 | 5 | 2 | 3 | 2 |
| 11 | 6 | 4 | 2 | 2 | 0 | 4 | 2 | 6 | 2 | 3 |
| 12 | 2 | 2 | 2 | 3 | 2 | 2 | 7 | 2 | 7 | 2 |
| 13 | 5 | 7 | 3 | 2 | 2 | 2 | 2 | 4 | 2 | 2 |
| 14 | 2 | 2 | 6 | 8 | 0 | 2 | 5 | 2 | 3 | 4 |
| 15 | 7 | 2 | 1 | 2 | 6 | 2 | 4 | 3 | 1 | 2 |

Summary
Sum: 15
Ave: 3.75
Min: 2
Max: 6
Count: 4

| | A | B | C | D | E | F | G | H | I | J |
|---|---|---|---|---|---|---|---|---|---|---|
| 1 | 3 | 2 | 9 | 2 | 5 | 2 | 1 | 8 | 2 | 9 |
| 2 | 2 | 5 | 0 | 2 | 2 | 8 | 2 | 5 | 7 | 6 |
| 3 | 4 | 2 | 3 | 3 | 2 | 3 | 4 | 3 | 2 | 4 |
| 4 | 2 | 2 | 2 | 2 | 5 | 6 | 2 | 2 | 2 | 2 |
| 5 | 5 | 4 | 6 | 7 | 0 | 2 | 2 | 3 | 3 | 4 |
| 6 | 2 | 2 | 2 | 2 | 6 | 2 | 3 | 2 | 5 | 2 |
| 7 | 0 | 6 | 2 | 3 | 4 | 7 | 2 | 2 | 4 | 3 |
| 8 | 6 | 2 | 4 | 3 | 3 | 2 | 1 | 2 | 2 | 2 |
| 9 | 4 | 9 | 2 | 2 | 2 | 2 | 2 | 7 | 2 | 5 |
| 10 | 2 | 7 | 3 | 2 | 4 | 2 | 5 | 2 | 3 | 2 |
| 11 | 6 | 4 | 2 | 2 | 0 | 4 | 2 | 6 | 2 | 3 |
| 12 | 2 | 2 | 2 | 3 | 2 | 2 | 7 | 2 | 7 | 2 |
| 13 | 5 | 7 | 3 | 2 | 2 | 2 | 2 | 4 | 2 | 2 |
| 14 | 2 | 2 | 6 | 8 | 0 | 2 | 5 | 2 | 3 | 4 |
| 15 | 7 | 2 | 1 | 2 | 6 | 2 | 4 | 3 | 1 | 2 |

Summary
Sum: 32
Ave: 3.55
Min: 2
Max: 7
Count: 9

PROVIDING SPREADSHEET FEATURES

BACKGROUND OF THE INVENTION

The performance of existing spreadsheet applications often degrades for very large data sets, with many features introducing noticeable delays that detrimentally affect user experience.

BRIEF DESCRIPTION OF THE DRAWINGS

Various embodiments of the invention are disclosed in the following detailed description and the accompanying drawings.

FIGS. 1A-1B illustrate embodiments of a spreadsheet feature.

DETAILED DESCRIPTION

Figure 2:
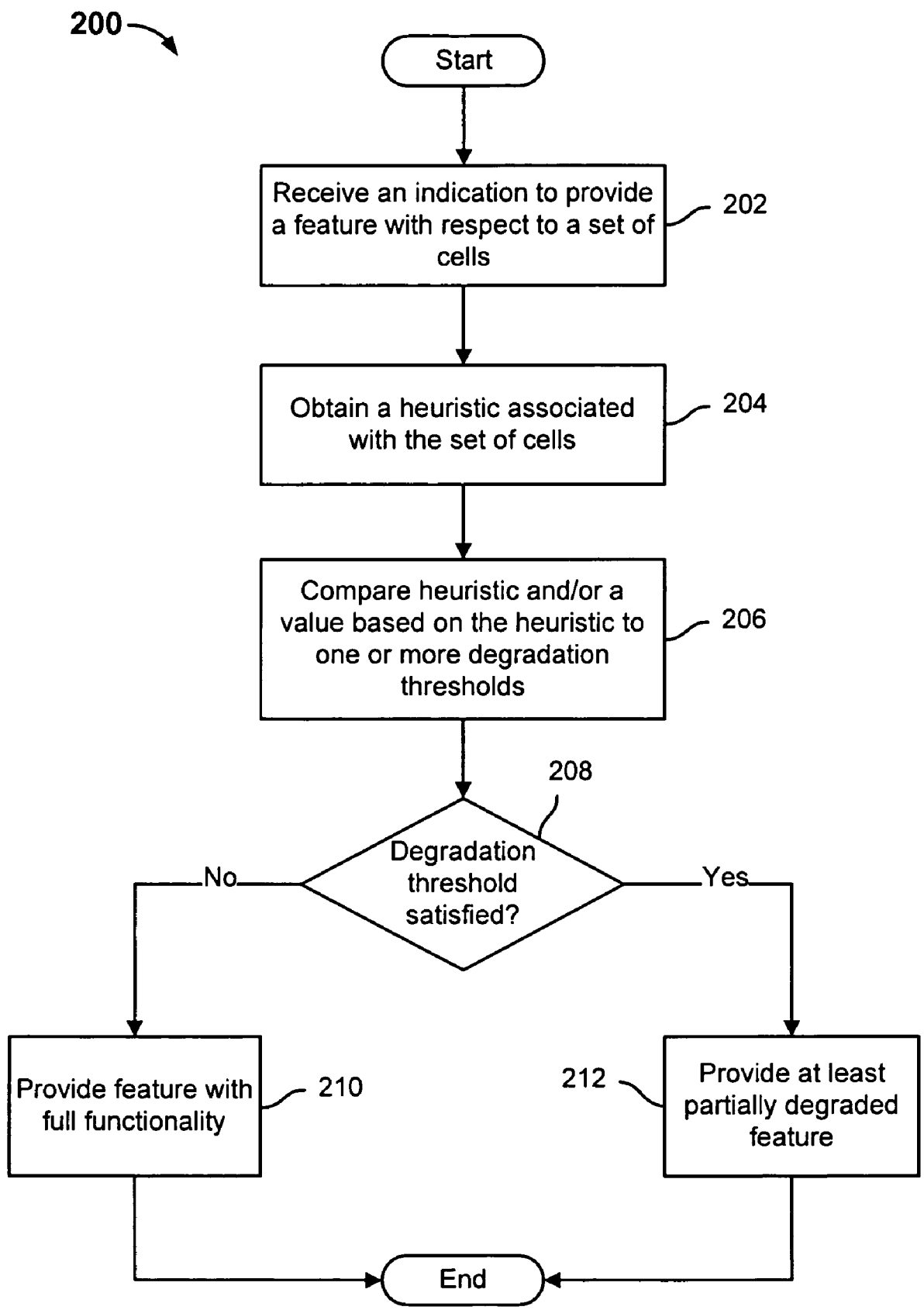
FIG. 2 illustrates an embodiment of a process for providing a feature.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

Heuristic based feature degradation and/or restoration is disclosed. In various embodiments, a spreadsheet may comprise data sets ranging in size from very small sets to very large sets. Certain spreadsheet features provided to enhance user experience require significant processing power for very large data sets and introduce noticeable latency, which may be undesirable in some cases. As described herein, in some embodiments, some spreadsheet features are dynamically degraded and/or disabled based on one or more heuristics associated with a set of cells with respect to which a feature is provided. In some embodiments, feature degradation is performed only for one or more non-essential features, i.e., features that do not affect core data values and/or associated computations. For example, feature degradation may be employed with respect to one or more features associated with visual presentation and/or formatting, such as font smoothing, hinted font rendering, cell border formatting, etc. In various embodiments, a spreadsheet feature may comprise a spreadsheet function, option, control, view, etc.

FIGS. 1A-1B illustrate embodiments of a spreadsheet feature. Specifically, FIGS. 1A-1B illustrate embodiments of a summary pane available with some spreadsheet applications. The summary pane provides a set of statistics (e.g., sum, average, min, max, count) associated with a selected range of cells and is dynamically updated in real time as a range is being selected. FIG. 1A illustrates an embodiment of a summary pane 100 for a selected range of cells, and FIG. 1B illustrates an embodiment of an update of the summary pane 100 as the range of FIG. 1A is extended. The summary pane is not an essential spreadsheet feature but is provided to give a convenient view of the statistics associated with a selection of cells. However, the processing power required to compute the statistics increases drastically for very large selections. Thus, this feature may introduce undesired latency when a large range of cells is selected, and it may be useful to degrade and/or disable the feature, e.g., based on the size of a selection.

In some embodiments, if the size of a selected range of cells exceeds a prescribed threshold, live update of the summary pane data during selection is disabled. In some such cases, the summary pane data is still provided for the range of cells once the range has been selected but is not dynamically updated during selection of the range. In some embodiments, if the size of a selected range of cells exceeds a prescribed threshold, the feature is completely disabled, and no summary pane data is provided even after the range has been selected. In some embodiments, a value or an estimate of the size of a selected range of cells may only include content bearing cells and exclude empty cells. As is apparent from the given example, the dynamic and flexible degrading and/or disabling of features such as the summary pane data that are provided to enhance user experience while still allowing core features of an application results in the performance of the application to be improved when operating on large sets of data and provides for a better user experience. In some embodiments, a feature may be degraded and/or disabled for a particular set of cells (e.g., a table) but still be available for one or more subsets of the set (e.g., a subset of cells of a table).

FIG. 2 illustrates an embodiment of a process for providing a feature. In some embodiments, process 200 is employed to dynamically degrade and/or disable a feature. In some embodiments, process 200 is employed for a non-essential feature such as the summary pane described with respect to FIGS. 1A-1B. Process 200 starts at 202 at which an indication to provide a feature with respect to a set of cells is received. In some embodiments, the indication is received in response to the feature being manually or automatically invoked with respect to the set of cells. In some embodiments, the set of cells comprises a table. In some embodiments, the set of cells comprises a range of cells. In some embodiments, the set of cells comprises a selected set of cells.

At 204, a heuristic associated with the set of cells is obtained. The heuristic associated with the set of cells allows a determination to be made about whether the feature should be degraded and/or disabled and in various embodiments may comprise any appropriate characteristic associated with the set of cells. In some embodiments, the heuristic comprises a size of the set of cells. In some cases, the size comprises a number of (content bearing) cells in the set of cells. In some cases, the size comprises an estimate of the size of the set of cells such as small, large, huge, and super-size. In some embodiments, the heuristic comprises an available processing power of a processor (e.g., of a client running the spreadsheet application) associated with the set of cells. In various embodiments, the heuristic may be obtained at 204 in any one or more appropriate manners. In some embodiments, the heuristic may be requested and obtained from an appropriate component of the associated application, e.g., via an API. For example, the size of a table may be obtained by querying an associated table object. In some embodiments, a dedicated process may be configured to monitor the heuristic, and the heuristic may be requested and received from such a process. In some embodiments, a component of the associated application associated with the feature may be configured to the monitor the heuristic. In some embodiments, 204 includes obtaining a plurality of heuristics.

At 206, the heuristic and/or a value based on the heuristic is compared to one or more degradation thresholds associated with the feature. In some embodiments, 206 includes determining a value based on one or more heuristics associated with the set of cells obtained at 204. For example, an expected latency for providing the feature with respect to the set of cells may be computed based on the size of the set of cells and/or the processing power associated with the set of cells. In some embodiments, 206 includes comparing one or more heuristics and/or values based on the heuristics with one or more degradation thresholds. At 208, it is determined whether a degradation threshold is satisfied. If it is determined at 208 that a degradation threshold is not satisfied, the feature is provided at 210 with full functionality, and process 200 subsequently ends. If it is determined at 208 that a degradation threshold is satisfied, an at least partially degraded version of the feature is provided at 212, and process 200 subsequently ends. In some embodiments, 212 comprises completely degrading or disabling the feature. In various embodiments, process 200 may be employed to independently degrade and/or disable an individual feature and/or to simultaneously degrade and/or disable a plurality of features.

In various embodiments, a feature may be defined with multiple levels of degradation and/or associated thresholds. For example, the embodiment of the summary pane feature described above comprises two levels of degradation: disable live update during selection and disable feature completely (i.e., do not provide summary pane).

Figure 3:
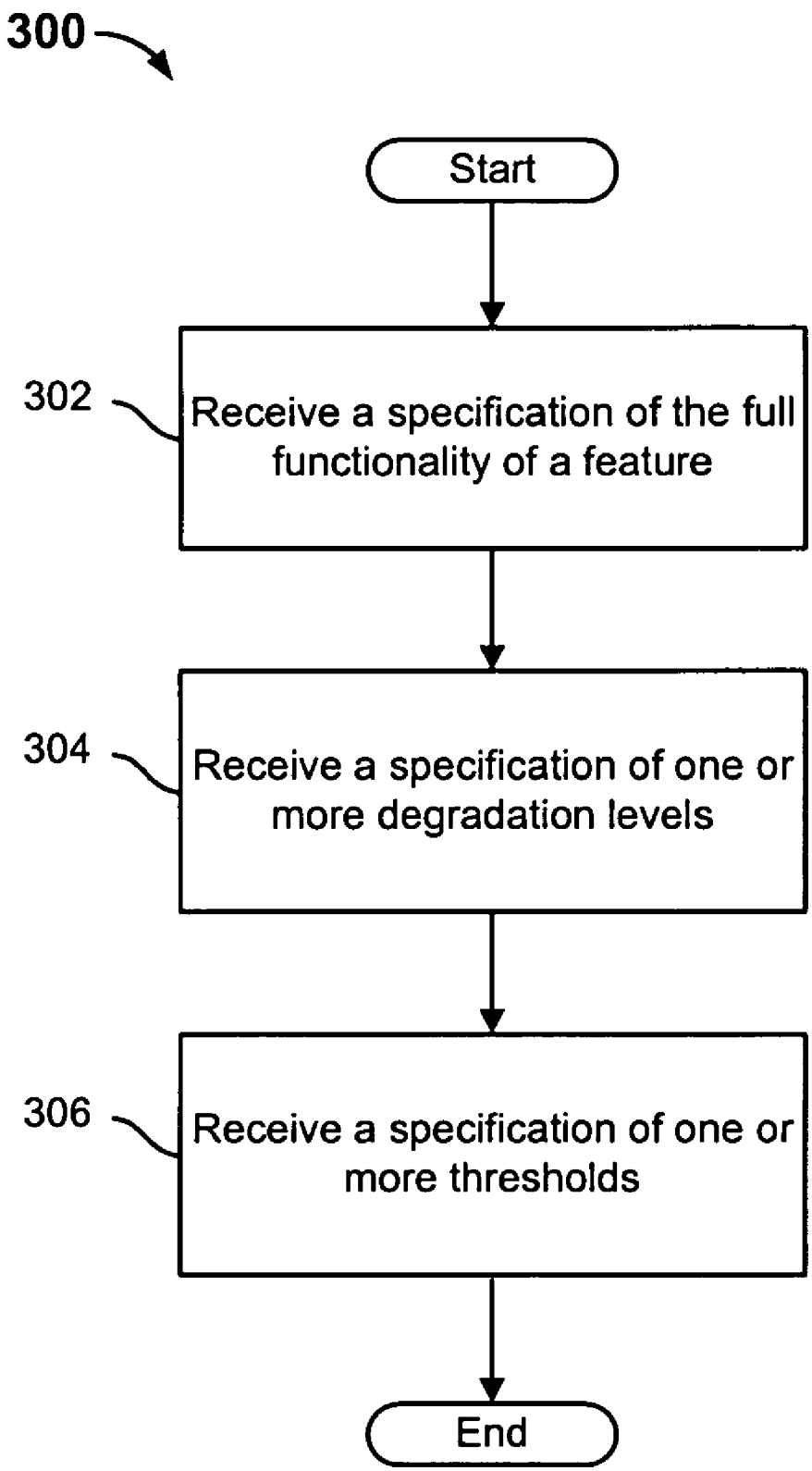
FIG. 3 illustrates an embodiment of a process for specifying or defining a feature.

FIG. 3 illustrates an embodiment of a process for specifying or defining a feature. Process 300 starts at 302 at which a specification of the full functionality of a feature is received. At 304, a specification of one or more degradation levels of the feature is received. In some such cases, for example, the degradation levels may be hierarchically specified, with the level at the top of the hierarchy exhibiting the least amount of degradation and the level at the bottom of the hierarchy exhibiting the highest amount of degradation. At 306, a specification of a set of one or more thresholds for the degradation levels of the feature is received. In some embodiments, the set of thresholds is associated with one or more heuristics of a set of cells with respect to which the feature may be invoked. Process 300 subsequently ends. In various embodiments, one or more thresholds associated with one or more heuristics may be specified for one or more degradation levels.

Figure 4:
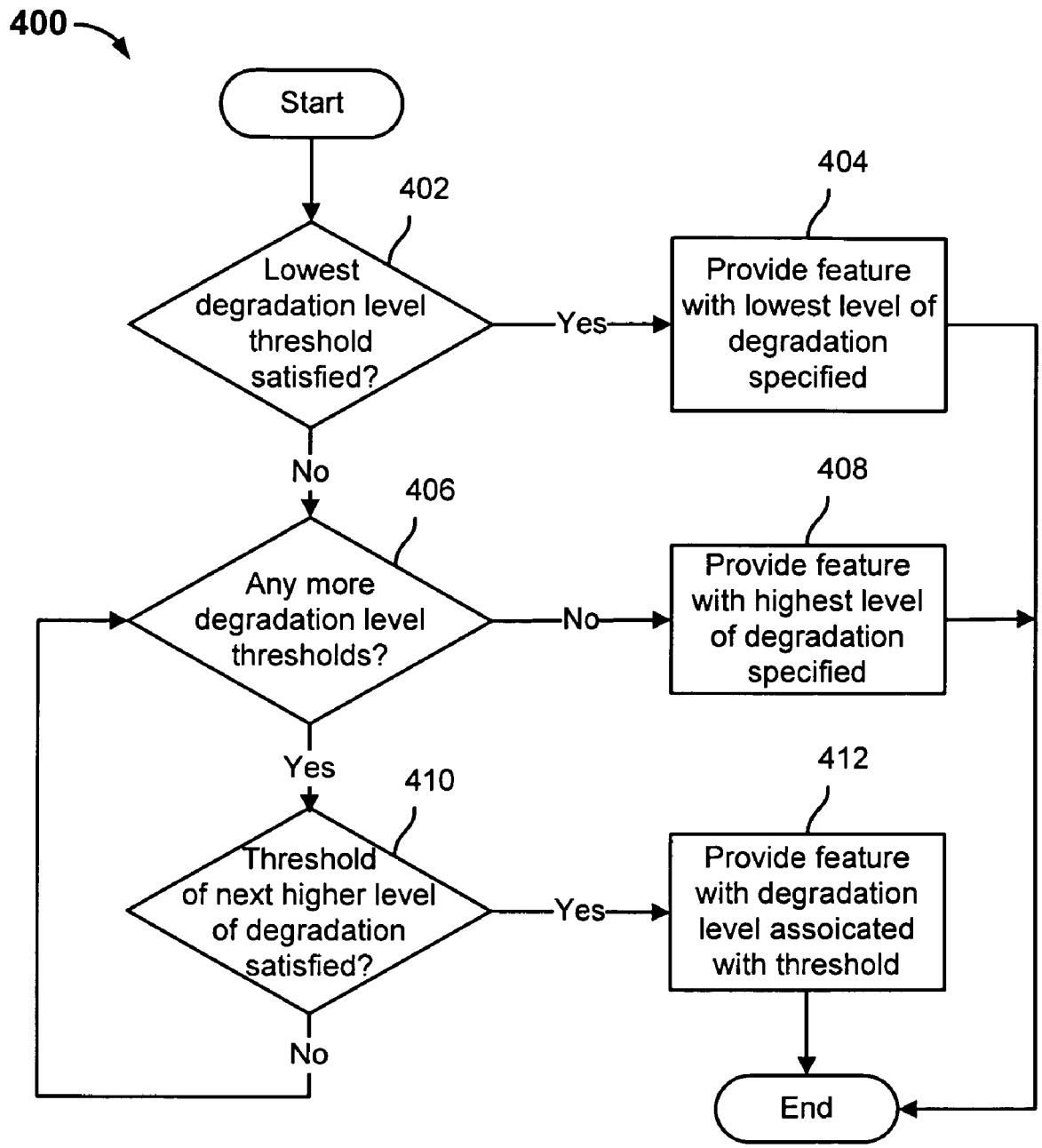
FIG. 4 illustrates an embodiment of a process for providing a degraded feature.

FIG. 4 illustrates an embodiment of a process for providing a degraded feature. In some embodiments, process 400 is employed at 212 of process 200 of FIG. 2. Process 400 starts at 402 at which it is determined whether a lowest degradation level threshold is satisfied. If it is determined at 402 that a lowest degradation level threshold is satisfied, the feature is provided at 404 with the lowest level of degradation specified, and process 400 subsequently ends. If it is determined at 402 that a lowest degradation level threshold is not satisfied, it is determined at 406 whether any more degradation level thresholds are specified. If it is determined at 406 that no more degradation level thresholds are specified, the feature is provided with the highest level of degradation specified at 408, and process 400 ends. In some embodiments, the highest degradation level comprises completely disabling the feature, and the feature is not provided at 408. If it is determined at 406 that another degradation level threshold is specified, at 410 it is determined whether the threshold associated with the next higher level of degradation is satisfied. If it is determined at 410, that the threshold associated with the next higher level of degradation is satisfied, the feature is provided with that level of degradation at 412, and process 400 subsequently ends. If it is determined at 410 that the threshold associated with the next higher level of degradation is not satisfied, process 400 continues at 406.

As described, the functionality of a feature for a set of cells exhibits dynamic degradation based on one or more (real time) heuristics associated with the set of the cells. In some embodiments, the functionality of the feature is also dynamically restored as the heuristics associated with the set of cells change in the opposite direction. For the summary pane feature described above, for example, once degraded and/or disabled, the functionality of the feature is restored as the selection size of the cells is decreased such that the selection size satisfies one or more restoration thresholds. For instance, when a restoration threshold associated with providing the summary pane for a selected set of cells is satisfied, that level of functionality of the feature becomes available again, and when a restoration threshold associated with providing live update of the summary pane during selection is satisfied, the feature is completely restored. In some embodiments, the degradation thresholds and restoration thresholds comprise the same threshold values.

Figure 5:
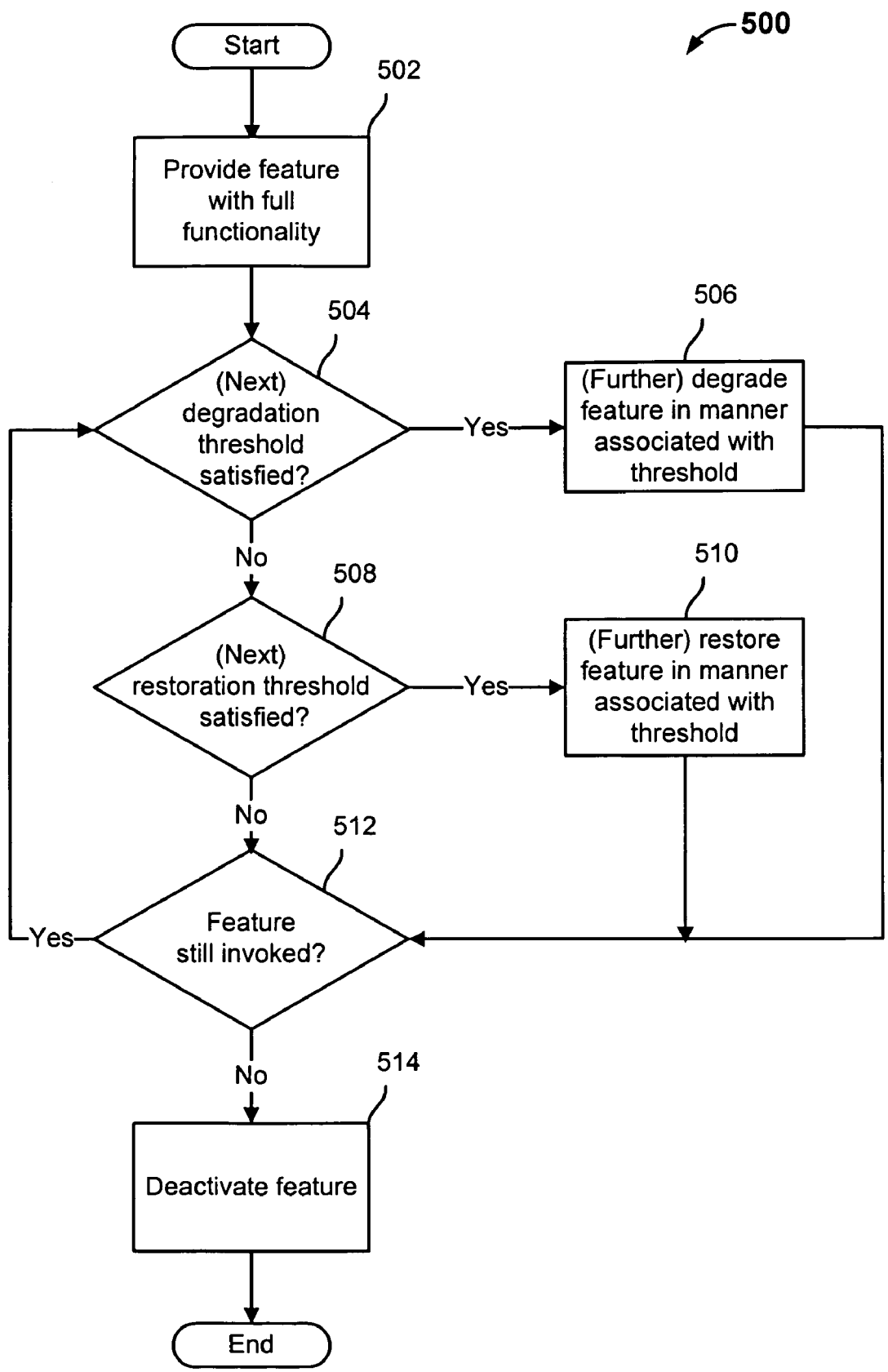
FIG. 5 illustrates an embodiment of a process for gracefully degrading and/or restoring a feature.

FIG. 5 illustrates an embodiment of a process for gracefully degrading and/or restoring a feature. Process 500 starts at 502 at which a feature is provided with respect to a set of cells with full functionality. At 504, it is determined if a (next) degradation threshold is satisfied. If it is determined at 504 that a (next) degradation threshold is satisfied, the feature is (further) degraded in a manner associated with the degradation threshold at 506, and process 500 proceeds to step 512. If it is determined at 504 that a (next) degradation threshold is not satisfied, it is determined at 508 whether a (next) restoration threshold is satisfied. If it is determined at 508 that a (next) restoration threshold is satisfied, the feature is (further) restored in a manner associated with the restoration threshold at 510, and process 500 proceeds to step 512. If it is determined at 508 that a (next) restoration threshold is not satisfied, it is determined at 512 whether the feature is still invoked with respect to the set of cells. If it is determined at 512 that the feature is still invoked with respect to the set of cells, process 500 proceeds to step 504. If it is determined at 512 that the feature is no longer invoked with respect to the set of cells, the feature is deactivated with respect to the set of cells at 514, and process 500 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product for providing a feature, the computer program product being embodied in a non-transitory computer readable storage medium and comprising computer instructions for:
   providing a spreadsheet feature that comprises one or more statistics on a current selection of spreadsheet cells and that is dynamically updated as the current selection of spreadsheet cells changes;
   determining that a threshold associated with providing the feature is satisfied, wherein the threshold is associated with processing needed to provide the feature; and
   at least partially degrading the feature for the current selection of spreadsheet cells so that latency resulting from providing the feature is at least in part avoided.

2. The computer program product recited in claim 1, wherein at least partially degrading the feature comprises disabling the feature.

3. The computer program product recited in claim 1, further comprising computer instructions for providing the at least partially degraded feature.

4. The computer program product recited in claim 1, wherein the current selection of spreadsheet cells comprises a range of cells.

5. The computer program product recited in claim 1, further comprising computer instructions for obtaining at least one heuristic associated with the current selection of spreadsheet cells.

6. The computer program product recited in claim 5, wherein the at least one heuristic comprises one or more of: a size of the current selection of spreadsheet cells, a number of cells in the current selection of spreadsheet cells, an estimate of a number of cells in the current selection of spreadsheet cells, a number of content bearing cells in the current selection of spreadsheet cells, and available processing power of a processor.

7. The computer program product recited in claim 5, further comprising computer instructions for determining a value based on the at least one heuristic.

8. The computer program product recited in claim 1, wherein the feature comprises a non-essential feature of an associated spreadsheet application that enhances user experience.

9. The computer program product recited in claim 5, further comprising computer instructions for comparing the at least one heuristic or a value based on the at least one heuristic with the threshold.

10. The computer program product recited in claim 1, wherein a plurality of thresholds including the threshold associated with a plurality of degradation levels are associated with the feature.

11. The computer program product recited in claim 1, wherein the threshold comprises a degradation threshold and further comprising computer instructions for:
   determining that a restoration threshold associated with the feature is satisfied with respect to the current selection of spreadsheet cells; and
   at least partially restoring the feature for the current selection of spreadsheet cells.

12. A system for providing a feature, comprising:
   a processor configured to:
      provide a spreadsheet feature that comprises one or more statistics on a current selection of spreadsheet cells and that is dynamically updated as the current selection of spreadsheet cells changes;
      determine that a threshold associated with providing the feature is satisfied, wherein the threshold is associated with processing needed to provide the feature; and
      at least partially degrade the feature for the current selection of spreadsheet cells so that latency resulting from providing the feature is at least in part avoided; and
   a memory coupled to the processor and configured to provide the processor with instructions.

13. The system recited in claim 12, wherein to at least partially degrade the feature comprises to disable the feature.

14. The system recited in claim 12, wherein the processor is further configured to obtain at least one heuristic associated with the current selection of spreadsheet cells.

15. The system recited in claim 14, wherein the at least one heuristic comprises one or more of: a size of the current selection of spreadsheet cells, a number of cells in the current selection of spreadsheet cells, an estimate of a number of cells in the current selection of spreadsheet cells, a number of content bearing cells in the current selection of spreadsheet cells, and available processing power of a processor.

16. The system recited in claim 12, wherein the threshold comprises a degradation threshold and wherein the processor is further configured to:
   determine that a restoration threshold associated with the feature is satisfied with respect to the current selection of spreadsheet cells; and
   at least partially restore the feature for the current selection of spreadsheet cells.

17. A method for providing a feature, comprising:
   providing a spreadsheet feature that comprises one or more statistics on a current selection of spreadsheet cells and that is dynamically updated as the current selection of spreadsheet cells changes;
   determining that a threshold associated with providing the feature is satisfied, wherein the threshold is associated with processing needed to provide the feature; and at least partially degrading the feature for the current selection of spreadsheet cells so that latency resulting from providing the feature is at least in part avoided.

18. The method recited in claim 17, wherein at least partially degrading the feature comprises disabling the feature.

19. The method recited in claim 17, further comprising obtaining at least one heuristic associated with the current selection of spreadsheet cells.

20. The method recited in claim 17, wherein the threshold comprises a degradation threshold and further comprising:
   determining that a restoration threshold associated with the feature is satisfied with respect to the current selection of spreadsheet cells; and
   at least partially restoring the feature for the current selection of spreadsheet cells.

* * * * *